Nov. 28, 1967    A. W. KAMMERER, JR., ET AL    3,355,142
SLEEVE OR PISTON TYPE VALVE DEVICE
Filed Sept. 29, 1964    2 Sheets-Sheet 1

ARCHER W. KAMMERER, JR.
LUIS F. CASTRO
INVENTORS.

BY Mellin, Moore & Weissenberger
ATTORNEYS.

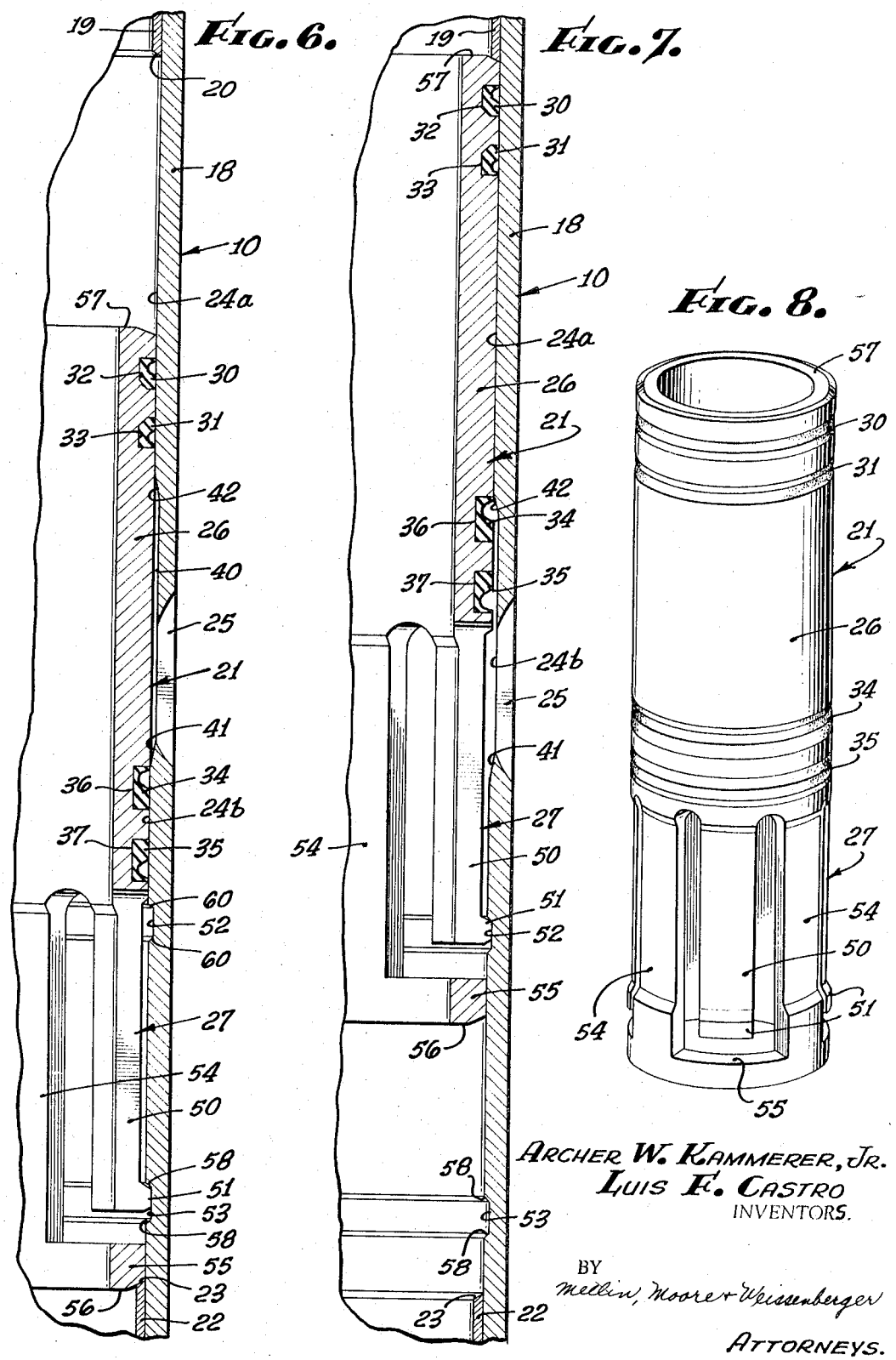

United States Patent Office 3,355,142
Patented Nov. 28, 1967

3,355,142
SLEEVE OR PISTON TYPE VALVE DEVICE
Archer W. Kammerer, Jr., Fullerton, Calif., and Luis F. Castro, Houston, Tex., assignors to Baker Oil Tools, Inc., City of Commerce, Calif., a corporation of California
Filed Sept. 29, 1964, Ser. No. 400,063
20 Claims. (Cl. 251—175)

ABSTRACT OF THE DISCLOSURE

A valve device having a ported body and a sleeve valve member shiftable in the body between positions opening and closing the body ports, the sleeve valve member carrying at least a pair of spaced elastomer seal rings provided with cylindrical surfaces disposed toward each other and sealingly engageable with the body, and also with circumferential relief grooves adjacent to the cylindrical surfaces which are disposed away from each other, so that each seal ring can hold pressure in one direction only, fluid pressure lock between the rings being relieved or prevented, and the rings also being prevented from binding or sticking against the body by permitting growth or swelling of each ring into its relief groove. The sleeve valve member is releasably latched it selected position to the body.

---

The present invention relates to valve devices, and more particularly to valve devices adapted to be incorporated in tubular strings disposed in well bores to control flow of fluids therethrough.

Slidable types of sleeve valve devices embodying elastomeric seal rings are used in strings of tubing located in well bores for the purpose of controlling flow of fluid between the interior and exterior of the tubing string. In a typical case, the valve sleeve is shifted within a companion body or housing between opened and closed positions, controlling flow of fluid through side ports in the body or housing. Heretofore, difficulty has been encountered in the proper operation of such valves and in connection with their failures, particularly under operating conditions of relatively high temperature or high pressure differentials, and combinations thereof.

The difficulties stem from the sticking or binding of the sleeve valve in its companion ported housing, due to deformation or swelling of the elastomer seal ring material under heat and pressure or chemical action, or due to the trapping of fluid pressure between the seal rings causing a pressure lock. If the seals are freed from their companion seal surfaces by the exertion of sufficient force on the valve sleeve, one or more seals may be damaged with resultant subsequent leaking of fluid past the damaged seal.

Damage to the elastomer seals has also occurred as a result of shifting the valve sleeve between its opened and closed positions when subjected to relative high pressure differentials. Opening of the valve, as well as its closing, under such adverse operating conditions can result in blowing of one or more seals out of their confining grooves, or in their substantial damage.

Accordingly, it is an object of the present invention to provide a valve device of the type indicated in which sticking or binding of the valve mechanism is prevented, despite its being subjected to high pressures and temperatures, as well as other adverse conditions, tending to cause the elastomeric seals to deform inordinately. Swelling of the seals will not cause a binding action between the valve device and its surrounding housing or body.

Another object of the invention is to prevent fluid pressure from being trapped between pliant elastic seal rings which would otherwise cause or tend to cause a pressure lock and binding of the rings between the valve sleeve and its surrounding valve housing or body.

A further object of the invention is to provide an improved valve device embodying elastomeric seal elements, such as rubber-like seal elements, in which the valve device can be opened and closed against high pressure differentials without causing damage to the seal elements or their blowing out of companion grooves, and the like.

An additional object of the invention is to provide a valve device adapted to be incorporated in a tubing string that is to be located in a well bore and embodying a valve sleeve capable of being shifted between valve opening and closing positions by a suitable shifting tool and mechanically latched in such positions, the valve sleeve being comparatively shorter in length and providing a greater lateral surface for engagement by the shifting tool.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 6 is an enlarged partial section of the valve device in closed position;

FIG. 7 is an enlarged partial section of the valve device in open position;

FIG. 8 is an isometric projection of the valve sleeve portion of the valve device.

Figure 1:
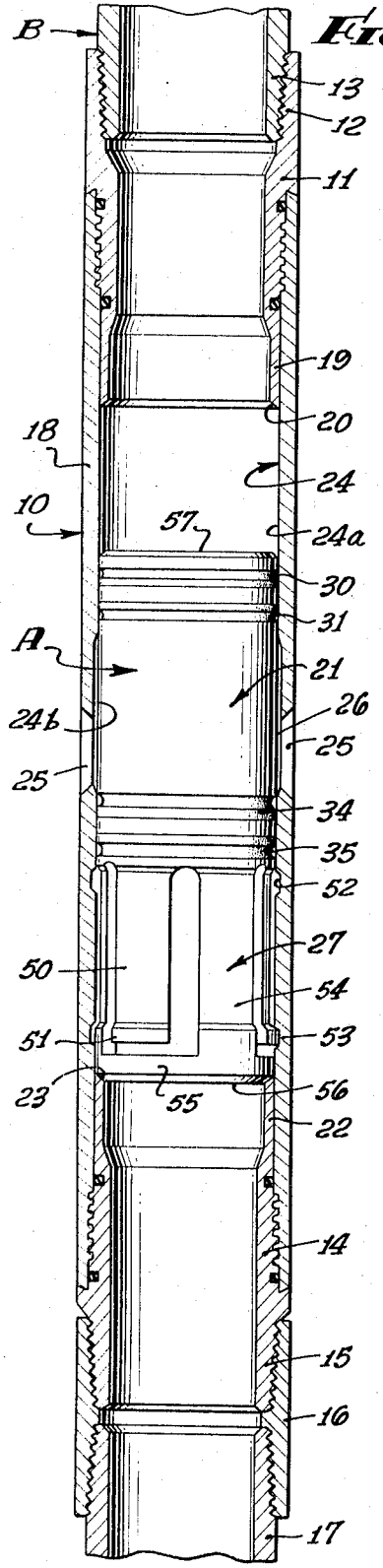
FIGURE 1 is a longitudinal section through a tubular string embodying a valve device, the sleeve valve portion being in side elevation, and disposed in valve closing position.

The valve device A embodying the present invention is illustrated in the drawings as being incorporated in a string of tubing B or other tubular string disposed in a well bore such as within a well casing (not shown). As an example, such tubular strings and valve devices are used in connection with a well packer (not shown) disposed in the well casing for the purpose of controlling the flow of fluid between the interior and the exterior of the tubing string.

The specific valve device A shown in the drawings includes an outer body or housing 10 adapted to be incorporated in and from part of the tubing string B. The body comprises an upper body sub 11 having an upper threaded box 12 for threaded attachment to an adjacent upper tubing section 13, and also a lower body sub 14 having a threaded pin 15 which can be threadedly secured to a suitable coupling 16, which is, in turn, threadedly attached to the upper end of a lower tubing section 17. The tubing sections 13, 17 and housing 10 constitute a portion of the tubing string B extending to the top of the well bore, and, in a typical case, also downwardly into appropriate sealing relation to a well packer (not shown) set in a well casing (not shown).

The main or intermediate section of the valve body or housing 10 is disposed between the upper and lower body subs 11, 14, the upper portion of the main valve body 18 being threadedly attached to the lower portion of the upper body sub 11, and the lower portion of the main body being threadedly secured to an upper portion of the lower body sub 14, the subs and main or intermediate body portion together constituting the external housing of the valve device. The upper body sub 11 may have a depending skirt 19, the lower end 20 of which forms a stop to limit the extent of upward movement of a valve sleeve 21 in the housing 10; whereas the lower body sub 14 has an upwardly extending skirt 22, the upper end 23 of which forms a stop adapted to be engaged by the valve sleeve 21 to limit downward movement of the latter in the housing.

The valve sleeve 21 is slidable longitudinally along the inner wall 24 of the main body 18 of the valve device between a position across a plurality of passages or side ports 25 extending through the wall of the main body, to close the latter, or to a position to one side of such side ports, in which the ports are open, allowing fluid flow between the interior of the housing 10 and its exterior. The valve sleeve includes an upper circumferentially continuous or imperforate portion 26 and a lower latch portion 27, the valve sleeve being slidable along the wall 24 of the main body and having a suitable working clearance therewith.

The valve sleeve 21 has a pair of upper seal rings 30, 31 mounted in companion peripheral grooves 32, 33 for sealing against the upper cylindrical surface or wall 24a of the valve body above its ports 25, and a pair of lower seal rings 34, 35 mounted in peripheral grooves 36, 37 adapted to slidably seal against a cylindrical sealing surface or wall 24b in the housing below its ports 25. The upper seals 30, 31 are capable of preventing fluid flow or leakage in both longitudinal directions, between the sleeve portion 26 and housing wall 24a, which is also true of the lower seals 34, 35 when they are engaging their companion lower cylindrical sealing surface 24b. The valve sleeve 21 is shiftable in an upward direction from a position across and closing the ports 25 (FIGS. 1, 6) to place the lower seal rings 34, 35, which may be made of rubber or rubber-like material or corresponding pliant, elastic or elastomeric material, above the ports (FIG. 7). The ports 25 open into a circumferentially continuous recess 40 in the inner wall of the housing 18, having a lower tapered surface 41 and an upper tapered surface 42, to prevent the existence of any sharp corners or edges that might cut the lower seals 34, 35 as they move past the housing ports.

In the specific valve device illustrated, the upper set of seal rings 30, 31 always remain in sealing engagement with the upper cylindrical sealing surface 24a. The upper and lower sides 42, 41 of the circumferential recess 40 are tapered, the lower side 41 serving to force the lower seals 34, 35 laterally inwardly for appropriate engagement with the lower cylindrical surface 24b. If the sleeve 21 were capable of being moved upwardly sufficiently, the upper tapered side 42 would compress the lower seals 34, 35 inwardly to facilitate their movement into engagement with the upper wall 24a. The upper and lower sides 42, 41 of the recess 40 have a relatively steep taper to facilitate movement of the lower seal rings 34, 35 thereby, and their slight inward deformation into the cylindrical sealing surface 24b or 24a of smaller diameter than the inside diameter of the recess.

The latch portion 27 of the valve sleeve 21 includes a plurality of circumferentially spaced latch arms 50 depending from the circumferentially continuous port closing portion 26 of the valve sleeve, which terminate in lower, outwardly projecting latch fingers 51 adapted to be received within an upper circumferentially continuous latch groove 52 and a lower circumferentially continuous latch groove 53. The arms 50 and fingers 51 are separated by longitudinal struts 54 that integrate the circumferentially continuous upper portion 26 of the valve sleeve with a lower circumferentially continuous ring portion 55 of the sleeve disposed below the latch arms and fingers, the lower ring portion 55 having a diameter permitting it to slide along the cylindrical wall 24 of the valve housing portion 18.

The shifting tool for moving the valve sleeve 21 upwardly or downwardly forms no part of the present invention, and for that reason is not illustrated. However, it is adapted to engage the lower end 56 of the lower ring portion 55 when the valve sleeve is to be shifted upwardly within the housing 10, and to engage the upper end 57 of the valve sleeve when the latter is to be shifted downwardly within the valve housing. Downward movement of the valve sleeve 21 is limited by engagement of the lower ring portion 55 with the upper end 23 of the housing skirt 22, at which time the latch fingers 51 snap into the lower latch groove 53 which has tapered upper and lower sides 58 (FIGS. 1, 6). The shifting tool (not shown) can move through the valve sleeve and be engaged with the lower end 56 of the latch ring, a sufficient force being exerted thereon to cause the upper tapered side 58 of the lower latch groove to cam the fingers 51 inwardly against the inherent spring force of the latch arms 50, whereupon the latch sleeve can be shifted upwardly to a port opening position, limited by engagement of the upper end 57 of the valve sleeve with the lower stop end 20 of the upper housing skirt 19, at which time the latch fingers 51 are disposed opposite the upper latch groove 52 and will snap thereinto, to releasably retain the valve sleeve 21 in its open position (FIG. 7). This upper groove 52 also has tapered upper and lower sides 60, so that subsequent engagement of the upper end 57 of the valve sleeve by the shifting tool, when the ports are to be closed, and the exertion of sufficient downward force thereby on the valve sleeve will cause the lower tapered side 60 of the groove to cam the fingers 51 inwardly out of the groove 52 and allow the valve sleeve 21 to be shifted back to its lower port closing position.

Because of the arrangement of the latch arms 50 and fingers 51 with respect to the circumferentially continuous port closing portion 26 of the valve sleeve, and the lower circumferentially continuous ring portions 55, a relatively large transverse surface is provided on the ends 57, 56 of the valve sleeve for engagement by the shifting tool, thereby insuring positive coupling of the shifting tool to the valve sleeve 21, regardless of its being shifted upwardly in the housing 10 or downwardly therewithin.

As stated above, the valve sleeve 21 has a pair of adjacent lower circumferential grooves 36, 37 in which a pair of rubber or rubber-like seal rings 34, 35 are mounted. Preferably, each of these seal rings is molded to the sides and bottom of its groove to prevent its inadvertent removal from the groove. As shown, each seal ring 34, 35 has a special configuration, including a seal portion 70 and a relief portion 71. The seal portion 70 has a cylindrical periphery 72 conforming to the cylindrical wall 24b of the valve body or housing 18 and adapted to firmly seal against the latter. Adjacent to the seal portion 70 is the relief portion 71, which consists of a circumferential groove 73 in the outer portion of the seal ring extending laterally inwardly to a substantial extent. As shown, the groove is defined by a wall 74 tapering inwardly away from the cylindrical surface 72 of the seal portion of the ring, this wall merging into an inner base portion 75 which then merges into another groove wall 76 that is inclined toward the periphery of the valve sleeve portion 26.

Both seal rings 34, 35 may be the same, but are oppositely arranged with their seal portions 70 facing one another. That is to say, the groove portions 73 are disposed outwardly of the seal portions 70, the seal portions projecting beyond the periphery of the valve sleeve 26, whereas the relief portions 71 of the seal rings may terminate at the periphery of the valve sleeve.

The upper set of seal rings 30, 31 are disposed in their companion grooves 32, 33 and are arranged in the same manner as the lower pair of seal rings 34, 35. However, since the upper seal rings always remain in sealing engagement with their companion cylindrical sealing surface 24a, it is not essential that they be molded to the walls and bases of their respective grooves. Instead, they may constitute separate members that are merely stretched over the valve sleeve portion 26, contracting into each groove snugly in engagement with the base and the upper and lower sides of each groove.

With the seals disposed on each side of the ports 25 when the valve is in a closed position (FIGS. 1, 6), comparatively high pressure differentials cannot produce leakage thereby, whether the high pressure differential is internally of the valve device or externally thereof. Moreover, when the valve sleeve 21 is shifted between open and closed positions, the pressure differential cannot damage any seal or blow it out of its groove. The high pressure differentials cannot bind a seal against the housing, nor can any deformation or growth of a seal ring cause any binding. Pressure cannot be trapped between the adjacent seal rings 34, 35 that would tend to cause a pressure lock therebetween and deformation and binding of the seal rings against the companion sealing surface 24b. This is all due to the arrangement of the seals with respect to one another and their particular configuration, as will now be pointed out in detail.

Figure 2:
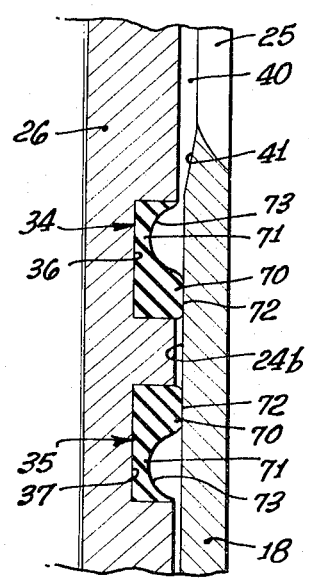
FIGS. 2, 3, 4 and 5 are enlarged fragmentary longitudinal sections through a portion of the valve device, illustrating different conditions of its seal devices resulting from different conditions encountered in a well bore.

If it is assumed that a pressure differential predominates externally of the valve housing 10, and that the valve sleeve 21 is in its closed position, such pressure cannot pass upwardly past the lower seal 31 of the upper set, nor downwardly past the upper seal 34 of the lower set. The pressure enters the ports 25 and the recess 40 and acts downwardly against the upper seal ring 34 of the lower set (FIG. 2), engaging its lower sealing portion 70 which is in firm sealing engagement around its full circumference with the cylindrical sealing surface 24b of the valve body or housing. The pressure is acting on the seal ring 34 in such manner as to tend to increase the sealing pressure of the ring portion 70 against the cylindrical sealing surface 24b of the housing. The lower seal ring 35 is performing no purpose when the pressure differential is externally of the housing, since the upper seal ring 34 is fully effective to prevent fluid leakage thereby. The same situation prevails with respect to the lower seal 31 of the upper set of rings 30, 31. It effectively seals against its companion cylindrical sealing surface 24a, the upper ring 30 of the set being ineffective.

However, in the event the pressure differential exists internally of the valve housing 10 and valve sleeve 21, it will act on the lower seal 35 of the lower pair of rings, and on the upper seal 30 of the upper pair of rings, the seal portions 70 of these rings being forced and retained firmly against their companion surfaces 24b or 24a in the same manner as the other rings 31, 34 seal against external pressure. With an internal pressure differential, the upper seal ring 34 of the lower set, and the lower seal ring 31 of the upper set are comparatively ineffective in providing any sealing action.

Thus, the seal ring arrangement is effective to withstand fluid pressure differentials in both directions, that is, those predominating within the valve apparatus A, as well as those predominating externally of the valve apparatus.

Figure 4:
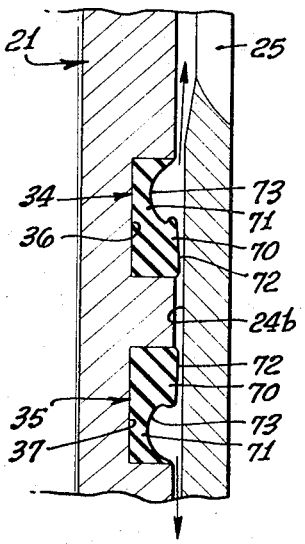

Because of the provision of the relief grooves 73 in the outer portions of a pair of adjacent seal rings, each ring can hold high pressure in only one direction. Thus, the upper ring 34 of the lower set can only hold pressure in a downward direction, but not pressure acting in an upward direction. Similarly, the lower ring 35 of the lower set can only hold pressure in a upward direction, but not in a downward direction. Accordingly, if any fluid is trapped between these seal rings 34, 35, such fluid pressure can deform one or both of the rings in the direction of its relief groove 73 (FIG. 4), since it can move the elastomeric material toward and partly into the relief groove, breaking the seal of the seal portion 70 of the ring with its companion surface and allowing the trapped fluid under pressure between the rings to bleed past the surface 72 and pass into the relief groove. Such trapped fluid pressure usually tends to occur during shifting of the valve sleeve 21, as for example, the shifting of the lower set of rings to their lower position closing the ports 25. If the pressure differential were thereafter relieved, the trapped pressure would, in prior seal devices, tend to impose a comparatively high axial or compressive force on the seal rings, urging them outwardly with greater force or pressure against their companion sealing surface. This cannot occur for the reasons mentioned above, since the fluid pressure can deform the seal portion 70 of each ring toward its relief groove 73 and be bled off by moving thereby (see FIG. 4). Thus, each seal ring, in effect, acts as a one-way or check valve, being capable of holding pressure in one direction only.

Figure 5:
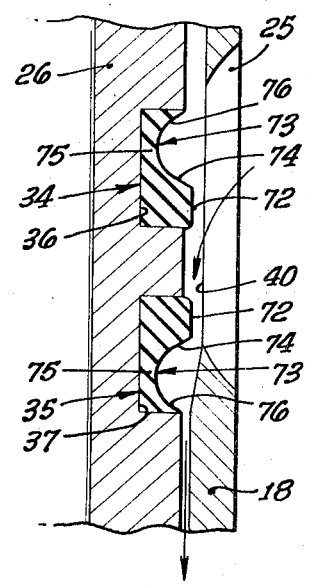

Assuming the valve sleeve 21 to be in its port closing position, and that it is moved upwardly (in the specific device illustrated in the drawings) to port opening position, there is little tendency to blow either of the lower seal rings 34 or 35 out of its groove 36 or 37. Assuming the existence of an external pressure differential, such tendency is resisted by the shear strength of the seal material, and, in addition, by bonding, as by molding, of the seal ring to the valve sleeve 21. In moving the sleeve 21 upwardly to a port opening position (see FIG. 5), it is only the shear strength and molding of the upper ring 34 that is required to resist the pressure differential tending to damage the seal ring 34 or blow it out of its groove 36. The lower seal ring 35 can allow the pressure to bleed by it, inasmuch as its upper seal portion 70 can be shifted toward its relief groove 73 and thereby allow the fluid to flow past its seal portion into the relief groove until, of course, the seal ring is within the port recess 40, in which the valve is in the open position, a full opening position being achieved by moving the lower seal 35 up above the ports 25, as disclosed in FIG. 7.

If the valve sleeve 21 is now moved downwardly to port closing position with an external pressure differential, the lower seal 35 will first move into the cylindrical sealing surface 24b below the ports, fluid pressure being allowed to leak by it in view of the ability of the upper portion 70 of the ring to be deformed downwardly into the region of the relief groove 73, as has been described above. When the upper seal 34 moved downwardly and engages its cylindrical sealing surface 24b, the valve A is closed immediately.

Assuming the valve sleeve 21 to be in its port closing position and to be moved upwardly with an internal pressure differential, the upper seal ring 34 of the lower set is actually ineffective, the lower seal 35 maintaining the closed relation of the valve against the cylindrical sealing surface 24b, until it moves upwardly out of such surface. Similarly, the lowering of the valve sleeve 21 to a port closing position against an internal pressure differential effects a closing of the ports 25 as soon as the upper seal portion 70 of the lower seal ring 35 engages its companion sealing surface or wall 24b of the valve housing or body 18.

The upper pair of seals 30, 31 also function to hold pressure in both directions, but each seal ring only holds pressure in one direction. Accordingly, any fluid pressure that might tend to be trapped between the seal rings 30, 31 can bleed past one or both of the seals toward their respective relief grooves 73. If one of the seal rings is holding pressure, then the other seal ring is ineffective and any trapped fluid under pressure can bleed past such latter ring toward and into its relief groove.

Figure 3:
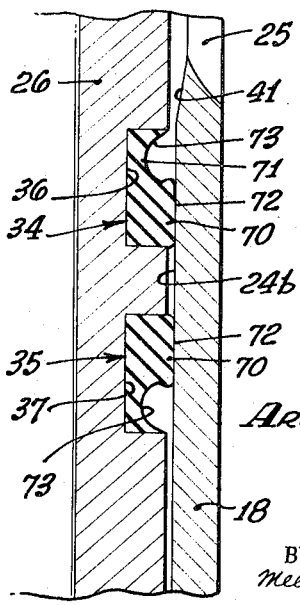

Not only do the relief groove 73 permit trapped pressure to bleed off, and thereby prevent the existence of a pressure lock between a pair of adjacent seal rings, but they also allow room for seal ring growth, which can occur under conditions of heat and pressure causing swelling of a seal ring. If a seal ring tends to swell, such swelling can occur into a relief groove 73, as shown in FIG. 3, and does not materially increase the pressure of the elastomeric material and its consequent binding against its companion sealing surface 24a or 24b.

It is to be noted that when the valve sleeve 21 is in its closed position, the upper seal ring 34 of the lower set is disposed closely adjacent to the lower end of the recess 40 into which the side ports 25 open (see FIG. 2 particularly), which reduces the area in which solids can collect and build up and tend to wedge or bind the valve sleeve. In view of the comparatively short length of any such solid build-up, upward movement of the valve sleeve 21 can readily shear off the foreign and undesired solids, preventing them from materially restricting or preventing movement of the valve sleeve to its port opening position.

It is, accordingly, apparent that a valve device has been provided in which sticking or binding of the shiftable valve sleeve 21 is prevented, or, at the very least, is minimized to a very considerable extent. Damage to seals does not occur, thereby preventing the valve from leaking. The valve sleeve can be shifted from a closed to an open position under high pressure differentials in order to permit equalizing of the pressures internally and externally of the valve apparatus, such shifting being capable of occurring repeatedly and without sticking of the parts or damage to the seal elements. Sticking or binding is prevented since the fluid pressure cannot be trapped between a pair of seal rings that would otherwise cause a pressure lock, nor can deformation or swelling of the seal rings effect binding of the valve sleeve 21 against the encompassing housing or body 10, because of the relief grooves 73 permitting growth of a seal ring without any substantial increase in its unit pressure, that would otherwise cause its binding against its companion sealing surface. The valve sleeve 21 has a comparatively short overall length, its construction in connection with its latch mechanism permitting a shifting tool to engage it at its upper end 57 to shift it downwardly and at its circumferentially continuous lower end 56 for the purpose of shifting it upwardly.

We claim:

1. In a valve device: a body member having a fluid passage; a valve member shiftable longitudinally in said body member to control flow of fluid through said passage; one of said members having a sealing surface; the other of said members having a pair of pliant, elastic seal rings spaced from each other and engageable with said sealing surface to close said passage, first portions of said seal rings disposed toward each other having cylindrical surfaces adapted to sealingly engage said sealing surface, and second portions of said seal rings disposed away from each other having circumferential relief grooves adjacent to said cylindrical surfaces.

2. In combination: a body member; a member shiftable longitudinally to said body member; one of said members having a sealing surface; the other of said members having a pair of pliant, elastic seal rings spaced from each other and engageable with said sealing surface to prevent fluid leakage between said members; first portions of said seal rings disposed toward each other having cylindrical surfaces adapted to sealingly engage said sealing surface, and second portions of said seal rings disposed away from each other having circumferential relief grooves adjacent to said cylindrical surfaces, each relief groove being defined by a first wall tapering away from the cylindrical surface of its seal ring in a direction axially away from said first portion of its seal ring and also away from said sealing surface, said first wall merging into an inner groove wall, said inner wall merging into a second wall tapering in a direction axially away from said first portion and toward said sealing surface.

3. In a valve device: a body member having a fluid passage; a valve member shiftable longitudinally in said body member to control flow of fluid through said passage; one of said members having a sealing surface; the other of said members having a pair of circumferential grooves spaced from each other; a pliant, elastic seal ring in each of said grooves and engageable with said sealing surface to close said passage, first portions of said seal rings disposed toward each other having cylindrical surfaces adapted to sealingly engage said sealing surface, and second portions of said seal rings disposed away from each other having circumferential relief grooves adjacent to such cylindrical surfaces.

4. In combination: a body member; a member shiftable longitudinally in said body member; one of said members having a sealing surface; the other of said members having a pair of circumferential grooves spaced from each other; a pliant, elastic seal ring in each of said grooves and engageable with said sealing surface to prevent fluid flow between said members; first portions of said seal rings disposed toward each other having cylindrical surfaces adapted to sealingly engage said sealing surface, and second portions of said seal rings disposed away from each other having circumferential relief grooves adjacent to said cylindrical surfaces, each relief groove being defined by a first wall tapering away from the cylindrical surface of its seal ring in a direction axially away from said first portion of its seal ring and also away from said sealing surface, said first wall merging into an inner groove wall, said inner wall merging into a second wall tapering in a direction axially away from said first portion and toward said sealing surface.

5. In a valve device: a body member having a fluid passage; a valve member shiftable longitudinally in said body member to control flow of fluid through said passage; one of said members having a first pair of pliant, elastic seal rings spaced from each other and sealingly engageable with said other member to close said passage; one of said members having a second pair of pliant, elastic seal rings spaced from each other and from said first pair and sealingly engageable with the other of said members; each of said pairs of seal rings having first portions disposed toward each other which have cylindrical sealing surfaces adapted to sealingly engage said other member, and also having second portions disposed away from each other which have circumferential relief grooves adjacent to said cylindrical surfaces.

6. In a valve device: a body member having a fluid passage; a valve member shiftable longitudinally in said body member to control flow of fluid through said passage; one of said members having a first pair of circumferential grooves spaced from each other and a second pair of circumferential grooves spaced from each other; a pair of pliant, elastic seal rings in each of said pairs of grooves and sealingly engageable with said other member to close said passage; each of said pairs of seal rings having first portions disposed toward each other which have cylindrical sealing surfaces adapted to sealingly engage said other member, and also having second portions disposed away from each other which have circumferential relief grooves adjacent to said cylindrical surfaces.

7. In a valve device: a body member having a fluid passage and an internal cylindrical sealing surface; a valve member shiftable longitudinally in said member to control flow of fluid through said passage; a pair of pliant, elastic seal rings on said valve member spaced from each other and engageable with said sealing surface to close said passage, first portions of said seal rings disposed toward each other having external cylindrical surfaces adapted to sealingly engage said internal sealing surface, and second portions of said seal rings disposed away from each other having external circumferential relief grooves adjacent to said cylindrical surfaces.

8. In combination: a body member having an internal cylindrical sealing surface; an inner member shiftable longitudinally in said body member; a pair of pliant, elastic seal rings on said inner member spaced from each other and engageable with said sealing surface, first portions of said seal rings disposed toward each other having external cylindrical surfaces adapted to sealingly engage said internal sealing surface, and second portions of said seal rings disposed away from each other and having external circumferential relief grooves adjacent to said cylindrical surfaces, each relief groove being defined by a first wall tapering away from the cylindrical surface of its seal ring in a direction axially away from said first portion of its seal ring and also away from said sealing surface, said first wall merging into an inner groove wall, said inner wall merging into a second wall tapering in a direction axially away from said first portion and toward said sealing surface.

9. In a valve device: a body member having a fluid passage and an internal cylindrical sealing surface; a valve member shiftable longitudinally in said body member to control flow of fluid through said passage; said valve member having a pair of circumferential grooves spaced from each other; a pliant, elastic seal ring in each of said grooves and engageable with said sealing surface to close said passage, first portions of said seal rings having external cylindrical surfaces to sealingly engage said sealing surface, and second portions of said seal rings disposed away from each other having external circumferential relief grooves adjacent to said cylindrical surfaces.

10. In combination: a body member having an internal cylindrical sealing surface; an inner member shiftable longitudinally in said body member and having a pair of circumferential grooves spaced from each other; a pliant, elastic seal ring in each of said grooves and engageable with said sealing surface; first portions of said seal rings disposed toward each other having external cylindrical surfaces engageable with said internal sealing surface to prevent fluid leakage between said members, and second portions of said seal rings disposed away from each other having external circumferential relief grooves adjacent to said cylindrical surfaces of said rings, each relief groove being defined by a first wall tapering away from the cylindrical surface of its seal ring in a direction axially away from said first portion of its seal ring and also away from said sealing surface, said first wall merging into an inner groove wall, said inner wall merging into a second wall tapering in a direction axially away from said first portion and toward said sealing surface.

11. In a valve device: a body member having a fluid passage and an internal cylindrical sealing surface; a valve member shiftable longitudinally in said body member to control flow of fluid through said passage; said valve member having a first pair of pliant, elastic seal rings spaced from each other and sealingly engageable with said cylindrical sealing surface to close said passage; said valve member having a second pair of pliant, elastic seal rings spaced from each other and from said first pair and sealingly engageable with said body member to prevent fluid leakage therebetween; each of said pairs of seal rings having first portions disposed toward each other which have external cylindrical sealing surfaces adapted to sealingly engage said body member, and also having second portions disposed away from each other which have external circumferential relief grooves adjacent to said cylindrical surfaces.

12. In a valve device: a body member having a fluid passage and an internal cylindrical sealing surface; a valve member shiftable longitudinally in said body member to control flow of fluid through said passage; said valve member having spaced pairs of external circumferential grooves, the grooves of each pair being spaced from each other; a pliant, elastic seal ring in each of said grooves; the pliant, elastic seal rings in one pair of grooves having cylindrical sealing surfaces adapted to sealingly engage said internal cylindrical sealing surface to close said passage; the seal rings in said other pair of grooves having portions disposed toward each other which have cylindrical sealing surfaces adapted to engage said body member to prevent fluid leakage between said members; the pair of rings in each pair of grooves having second portions disposed away from each other which have external circumferential relief grooves adjacent to the cylindrical surfaces of said pair of rings.

13. In a valve device: a tubular body member having a side port; a valve member shiftable longitudinally in said body member between positions opening and closing said port; one of said members having a cylindrical sealing surface; the other of said members having a pair of pliant, elastic seal rings a spced from each other and engaging said sealing surface at one side of said port when said valve member is disposed across said port to close the same; first portions of said seal rings disposed toward each other having cylindrical surfaces adapted to sealingly engage said sealing surface, and second portions of said seal rings disposed away from each other having circumferential relief grooves adjacent to said cylindrical surfaces.

14. In a valve device: a tubular body member having a side port; a valve member shiftable longitudinally in said body member between positions opening and closing said port; one of said members having a first cylindrical sealing surface; the other of said members having a first pair of pliant, elastic seal rings spaced from each other and engaging said sealing surface at one side of said port when said valve member is disposed across said port to close the same; one of said members having a second cylindrical sealing surface; the other of said members having a second pair of pliant, elastic seal rings spaced from each other engaging said second sealing surface at the opposite side of said port; first portions of each pair of seal rings having cylindrical surfaces adapted to sealingly engage a companion sealing surface, and second portions of said seal rings disposed away from each other having circumferential relief grooves adjacent to said cylindrical surfaces.

15. In a valve device: a tubular body member having a side port and an internal cylindrical sealing surface to one side of said port; a valve member shiftable longitudinally in said body member between positions opening and closing said port; a pair of pliant, elastic seal rings spaced from each other and mounted on said valve member and engageable with said sealing surface at one side of said port when said valve member is disposed across said port to close the same; first portions of said seal rings disposed toward each other having external cylindrical surfaces adapted to sealingly engage said internal sealing surface, and second portions of said seal rings disposed away from each other having circumferential relief grooves adjacent to said cylindrical surfaces.

16. In a valve device: a tubular body member having a side port and first and second internal cylindrical sealing surfaces on opposite sides of said port; a valve member shiftable longitudinally in said body member between positions opening and closing said port; said valve member having a first pair of pliant, elastic seal rings spaced from each other and engaging said first sealing surface when said valve member is disposed across said port to close the same; said valve member having a second pair of pliant, elastic seal rings spaced from each other and engaging said second sealing surface; first portions of each of said pairs of seal rings disposed toward each other having cylindrical surfaces adapted to sealingly engage their companion internal sealing surface, and second portions of each of said pairs of seal rings disposed away from each other having circumferential relief grooves adjacent to said cylindrical surfaces of said pair of seal rings.

17. In a valve device: a tubular body member having a side port and first and second internal cylindrical sealing surfaces on opposite sides of said port; a valve member shiftable longitudinally in said body member between positions opening and closing said port; said valve member having first and second longitudinally spaced pairs of circumferential grooves; a pliant, elastic seal ring in each of said grooves; the seal rings in said first pair of grooves having portions disposed toward each other which have cylindrical surfaces adapted to sealingly engage one of said internal sealing surfaces; the seal rings in said second pair of grooves having portions disposed toward each other which have external cylindrical surfaces adapted to sealingly engage said other sealing surface; the pair of seal rings in each pair of grooves having portions disposed away from each other which have circumferential relief grooves adjacent to said cylindrical surfaces of said pair of rings.

18. In a valve device: a body member having a fluid passage and a latch groove; a sleeve shiftable longitudinally in said body member and comprising a valve portion adapted to close said passage when said sleeve is in one position in said body member and to open said passage when said sleeve is in another position in said body member, said sleeve also comprising a latch portion including a plurality of circumferentially spaced latch arms integral with said valve portion and having latch elements expandable into said latch groove to releasably retain said valve member in one of said positions; said sleeve further comprising a ring portion separate from said arms and longitudinally spaced from said latch elements, and means interconnecting said ring portion and valve portion.

19. In a valve device: a body member having a fluid passage and a latch groove; a sleeve shiftable longitudinally in said body member and comprising a valve portion adapted to close said passage when said sleeve is in one position in said body member and to open said passage when said sleeve is in another position in said body member, said sleeve also comprising a latch portion including a plurality of circumferentially spaced latch arms integral with said valve portion and having latch elements expandable into said latch groove to releasably retain said valve member in one of said positions; said sleeve further comprising a ring portion separate from said arms and longitudinally spaced from said latch elements, and struts between said arms interconnecting said ring portion and valve portion.

20. In a valve device: a body member having a fluid passage and a latch groove; a sleeve shiftable longitudinally in said body member and comprising a valve portion adapted to close said passage when said sleeve is in one position in said body member and to open said passage when said sleeve is in another position in said body member, said sleeve also comprising a latch portion including a plurality of circumferentially spaced latch arms integral with said valve portion and having terminal latch elements integral with said arms and expandable into said latch groove to releasably retain said valve portion in one of said positions, said sleeve further comprising a ring portion separate from said arms and longitudinally spaced from said terminal elements, and struts between said arms integral with said valve portion and with said ring portion.

References Cited
UNITED STATES PATENTS

| | | | |
|---|---|---|---|
| 2,303,392 | 12/1942 | Scaramucci | 251—175 X |
| 2,898,082 | 8/1959 | Von Almen | 251—175 X |
| 3,016,914 | 1/1962 | Keithahn | 137—515 |
| 3,071,193 | 1/1963 | Raulins | 166—226 |
| 3,094,307 | 6/1963 | Alley | 251—344 X |
| 3,186,680 | 6/1965 | Pool | 251—175 |
| 3,233,677 | 2/1966 | Myers | 251—344 X |
| 3,273,649 | 9/1966 | Tamplen | 251—344 X |

CLARENCE R. GORDON, *Primary Examiner.*